(12) United States Patent
Niederer et al.

(10) Patent No.: US 11,395,376 B2
(45) Date of Patent: Jul. 19, 2022

(54) PTC HEATING DEVICE AND ELECTRIC HEATING DEVICE WITH SUCH A PTC HEATING DEVICE AND METHOD FOR PRODUCING AN ELECTRIC HEATING DEVICE

(71) Applicant: Eberspächer catem GmbH & Co. KG, Herxheim (DE)

(72) Inventors: Michael Niederer, Kapellen-Drusweiler (DE); Rüdiger Freitag, Landau (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 0 days.

(21) Appl. No.: 17/091,070

(22) Filed: Nov. 6, 2020

(65) Prior Publication Data

US 2021/0144812 A1    May 13, 2021

(30) Foreign Application Priority Data

Nov. 7, 2019  (DE) ..................... 10 2019 217 234.2

(51) Int. Cl.
| | |
|---|---|
| *H05B 3/06* | (2006.01) |
| *H05B 3/26* | (2006.01) |
| *F24H 3/06* | (2022.01) |
| *H05B 1/02* | (2006.01) |
| *F24H 9/1863* | (2022.01) |

(Continued)

(52) U.S. Cl.
CPC ............. *H05B 3/06* (2013.01); *F24H 9/1872* (2013.01); *H05B 1/0236* (2013.01); *B60H 1/2221* (2013.01); *B60H 2001/2278* (2013.01); *F24H 3/022* (2013.01); *F24H 3/0405* (2013.01);

(Continued)

(58) Field of Classification Search
None
See application file for complete search history.

(56) References Cited

U.S. PATENT DOCUMENTS

| | | |
|---|---|---|
| 8,183,505 B2 | 5/2012 | Niederer et al. |
| 2007/0068913 A1 | 3/2007 | Zeyen et al. |

(Continued)

FOREIGN PATENT DOCUMENTS

| | | |
|---|---|---|
| DE | 201 21 116 U1 | 4/2003 |
| EP | 1768457 | 5/2008 |

(Continued)

*Primary Examiner* — Joseph M. Pelham
(74) *Attorney, Agent, or Firm* — Boyle Fredrickson S.C.

(57) ABSTRACT

A PTC heating device for introduction into a receiving pocket of an electric heating device includes at least one PTC element, a conductor track that is electrically connected to the PTC element, and insulating layers that are abutted in a thermally conductive manner against the PTC element. A frame-shaped casing joins the at least one PTC element, the conductor track, and the insulating layers as a unit. The frame-shaped casing has a leading frame member with elastic guide tabs which, in an initial assembly state, project on oppositely disposed sides of the frame-shaped casing over the heat-emitting open surface respectively associated with them, which are inclined obliquely from the leading frame member in a direction of the open surface, and which are elastically pivotable. During heating device assembly, the PTC heating device is centered and guided by the elastic guide tabs when introduced into a heating rib of a heating chamber.

11 Claims, 2 Drawing Sheets

(51) Int. Cl.
   *F24H 3/04*  (2022.01)
   *B60H 1/22*  (2006.01)
   *F24H 3/02*  (2022.01)

(52) U.S. Cl.
   CPC .. *H05B 2203/009* (2013.01); *H05B 2203/016* (2013.01); *H05B 2203/02* (2013.01)

(56) References Cited

U.S. PATENT DOCUMENTS

| | | | | |
|---|---|---|---|---|
| 2008/0099464 | A1* | 5/2008 | Niederer | F24H 3/082 |
| | | | | 219/520 |
| 2017/0295613 | A1* | 10/2017 | Kim | B60H 1/2221 |
| 2018/0156494 | A1 | 6/2018 | Bohlender et al. | |
| 2020/0340708 | A1* | 10/2020 | Walz | F24H 9/02 |
| 2021/0045194 | A1* | 2/2021 | Hort | H05B 1/0294 |
| 2021/0127456 | A1* | 4/2021 | Salahub | F24H 9/1827 |
| 2021/0247105 | A1* | 8/2021 | Salahub | H05B 3/26 |
| 2021/0354530 | A1* | 11/2021 | Klingebiel | F24H 9/1872 |

FOREIGN PATENT DOCUMENTS

| | | |
|---|---|---|
| EP | 2190256 | 5/2010 |
| EP | 2190256 A1 | 5/2010 |
| EP | 2724086 A2 | 4/2014 |
| EP | 3101364 | 12/2016 |
| EP | 3101365 | 12/2016 |
| EP | 2724086 | 10/2018 |
| EP | 3416456 | 12/2018 |

* cited by examiner

PTC HEATING DEVICE AND ELECTRIC HEATING DEVICE WITH SUCH A PTC HEATING DEVICE AND METHOD FOR PRODUCING AN ELECTRIC HEATING DEVICE

BACKGROUND OF THE INVENTION

1. Field of the Invention

The present invention relates to a PTC heating device for an electric heating device. The PTC heating device has a casing that joins at least one PTC element, conductor tracks electrically connected to the PTC element, and insulating layers possibly abutting in a heat-conductive manner against the PTC element as a unit and has contact strips projecting over itself which are connected in an electrically conductive manner to the conductor tracks for energizing the PTC element with different polarities.

2. Background of the Invention

Such a PTC heating device is known, for example, from EP 2 190 256 A1. This PTC heating device has a frame comprising frame openings passing through the frame, in each one of which at least one PTC element is received which is provided on both sides with contact plates forming the conductor tracks. A respective insulating layer abuts against the side opposite the PTC element. These elements are overmolded with adhesive, whereby the components of the PTC element carrying the power current are to be sealed against the outer side of the PTC heating element.

According to an alternative proposal according to EP 2 724 086, a PTC heating device is received in a flat tube in order to separate the PTC heating device from the medium to be heated. The flat tube provided in the aforementioned prior art is an example of a heating rib within the meaning of the present invention. A heating rib within the meaning of the present invention can also project from a partition wall which separates a heating or circulation chamber, respectively, for heating a medium from a connection chamber in which the contact zones are exposed.

SUMMARY

The introduction of a PTC heating device into the heating rib is problematic, not least for the reason the inner walls of the receiving pocket of the heating rib are to abut against the heat-emitting open surface of the PTC heating device with good thermal conductivity, which entails that the distance between the corresponding inner walls and the heat-emitting open surfaces of the PTC heating device is to be very small, if not to be only in the tolerance range. The PTC heating device must then be positioned precisely relative to the receiving pocket in order to avoid damage to the PTC heating device when it is introduced into the heating rib.

The present invention seeks to provide a solution that remedies this issue entirely or in part.

For this purpose, a PTC heating device for the introduction into a receiving pocket of an electric heating device includes, the PTC heating device includes at least one PTC element, a conductor track that is electrically connected to the PTC element, insulating layers that are abutted in a thermally conductive manner against the PTC element, and a frame-shaped casing. The frame shape casing joins the at least one PTC element, the conductor track, and the insulating layers as a unit and has contact strips projecting over itself which are connected to the conductor tracks in an electrically conductive manner for energizing the PTC element with different polarities. The frame-shaped casing forms mutually oppositely disposed recesses, in each of which is exposed a respective heat-emitting open surface connected in a thermally conductive manner to the main side surface of the PTC element. The frame-shaped casing has a leading frame member with elastic guide tabs which, in an initial assembly state, project on oppositely disposed sides of the frame-shaped casing over the heat-emitting open surface respectively associated with them, and which are inclined obliquely from the leading frame member in a direction of the open surface and are elastically pivotable.

TPTC heating device according to the invention has at least one PTC element and conductor tracks which typically abut against oppositely disposed surfaces of the PTC element. The conductor tracks and the at the least one PTC element are typically located in a frame opening formed by the casing. An insulating layer can be provided on the outer side of the conductor tracks, in particular with high-voltage applications and/or for installing the PTC heating device according to the invention in a metallic heating rib, at least on the outer side of one of the conductor tracks. This insulating layer typically completely covers the conductor track or the PTC element, respectively. Both conductor tracks may be provided with a respective insulating layer on their outer side. The insulating layer can be formed by a ceramic plate, for example, an aluminum oxide plate. The insulating layer can also have a multilayer structure, for example, be formed from a combination of a plastic film with a ceramic plate, as is known, for example, from EP 1 768 457 A1. The insulating layers can also be dispensed with if, for example, the inner surface of the heating rib is coated with electrically insulating material.

The assembled casing has oppositely disposed recesses. For example, the PTC element can be exposed with its main side surface in the recesses or a conductor track abutting thereagainst on the outer side can be provided there, or an insulating layer that is abutted on the outer side against the PTC element or the conductor track. In any case, a respective heat-emitting open surface of the PTC heating device is located in the region of the two recesses. The outer surface of the PTC heating device, which is connected to a main side surface of the PTC element in a thermally conductive manner, is there understood to be the open surface. This main side surface is the largest side surface of the PTC element which is typically formed to be cuboid-shaped. The other surfaces that typically connect these main side surfaces in a right-angled extension to the main side surfaces are referred to hereafter as face side surfaces. They have a significantly smaller width than the main side surfaces. The width of the face side surfaces is typically smaller by at least a factor of 3 than the width of the main side surfaces. The width of the face side surfaces determines the height of the PTC element. The conductor tracks typically abut against the main side surfaces of the PTC element that extract the heat, so that the heat can pass from the main side surfaces of the PTC element through the conductor tracks and, possibly, through the insulating layer to the heat-emitting open surface. The oppositely disposed open surfaces have a greater distance from one another in the thickness direction of the frame-shaped casing than the frame-shaped casing itself. The heat-emitting surfaces there form outer surfaces of the PTC heating device which generally project slightly relative to the frame-shaped casing. The heat extraction of the heat generated by the PTC element takes place predominantly via these open surfaces.

In the frame-shaped casing, guide tabs are provided on a leading frame member. These guide tabs project over the heat-emitting surface that is respectively associated with them in an initial state. The guide tabs are mounted pivotable on the leading frame member. They are typically connected to the frame member by way of an integral hinge. The elastic guide tabs are generally already in their non-pivoted initial state inclined in the direction of the open surface, i.e., inclined away from the leading frame member. The elastic guide tabs can be elastically pivoted inwardly.

The elastic guide tabs projecting on oppositely disposed sides of the frame-shaped casing therefore form a wedge-shaped guide which is intended to facilitate the introduction of the PTC heating device into the receiving pocket of the heating rib. The wedge-shaped guide allows the PTC heating device to be centered relative to the edges of the receiving pocket when the PTC heating device is pushed into the heating rib. Like in prior art, the heating rib can be formed by a flat tube which, for example, is sealed by deformation and subsequent welding or adhesive bonding of the oppositely disposed edges at the end that is in the direction of insertion disposed oppositely.

The elasticity of the guide tabs allows the guide tabs to be introduced into the heating rib after the PTC heating device has been centered relative to the heating rib, where the elastic guide tabs pivot inwardly. They can continue to guide the introduction motion with respect to the inner surfaces so that the heat-emitting open surfaces slide past the inner walls of the receiving pocket in a predetermined manner.

The present invention thus offers the possibility of simple positioning of the PTC heating device relative to the receiving pocket of the heating rib and the introduction thereinto, without the risk of the PTC heating device being damaged.

The frame-shaped casing may be made of plastic material and forms the guide tabs integrally. As mentioned above, the elastic guide tabs are typically connected to the leading frame member by way of an integral hinge. The leading frame member is the member that is first introduced into the receiving pocket. The leading frame member is typically located opposite a frame member over which the contact strips project. The contact strips typically project on the same side from the casing. The leading frame member is accordingly the lowermost element within the receiving pocket, starting out from the edges of the same.

With regard to a pivoting motion of the elastic guide tabs that is as unimpeded as possible, it is proposed according to a development of the present invention to provide at least one recess which is formed to be adapted to accommodate the inwardly pivoted guide tab. Two guide tabs projecting from oppositely disposed sides of the frame-shaped casing may be provided in a single recess. This recess can entirely or in part accommodate the two elastic guide tabs pivoting in from opposite sides.

In a development of the present invention, two respective pairs of guide tabs projecting to opposite sides are provided next to one another in the width direction of the casing on the leading frame member. The pairs are accordingly spaced from each other in the width direction, i.e. transverse to the direction of introduction of the PTC heating device into the heating rib.

The present invention may also provide an electric heating device having the features of claim 6. This electric heating device can be a heating device for heating a medium in a motor vehicle. The medium can be a liquid or gaseous medium, in particular air. The electric heating device has a partition wall that separates a connection chamber from a heating chamber. The heating rib, which accommodates the PTC heating device, protrudes into the heating chamber. The contact strips for the electrical connection of the PTC heating device to the power current are exposed in the connection chamber and are there connected in an electrically conductive manner to the power current, typically by way of a plug connection.

The present invention further specifies a method for producing the aforementioned electric heating device. For this purpose, a PTC heating device according to the invention is introduced first with the leading frame member into the heating rib. The elastic guide tabs, which in their initial state project in a wedge-shape manner from the leading frame member, are there abutted against oppositely disposed edges of the receiving pocket, whereby the aforementioned centering of the PTC heating device is effected. As the introduction motion progresses, the elastic guide tabs are pivoted inwardly. They can continue to accompany the introduction motion in that they are elastically supported at oppositely disposed inner surfaces of the receiving pocket. At the end of the process, the heat-emitting open surfaces are abutted against these oppositely disposed walls in a thermally conductive manner. This does not necessarily have to be the consequence of the motion of the PTC heating device into the heating rib. It instead may be deformed after the PTC heating device has been introduced, so that the oppositely disposed inner walls of the heating rib abut the open surfaces in a thermally conductive manner. It is to be noted that the necessary deformation of the heating rib is effected in such a way that, after a deformation tool is relieved of load, the relaxing elastic components of the deformation do not cause the inner walls to again detach from the heat-emitting open surfaces. An edge of the heating rib which respectively surrounds the open surface laterally is instead typically deformed. The heating rib is accordingly not only abutted against the heat-emitting open surface, but is also deformed inwardly beyond the open surface, specifically in the edge region of the heating rib where the PTC heating device is not provided.

BRIEF DESCRIPTION OF THE DRAWINGS

Further details and advantages of the present invention shall arise from the following description of an embodiment of the invention in combination with the drawing, in which.

DETAILED DESCRIPTION

Figure 1:
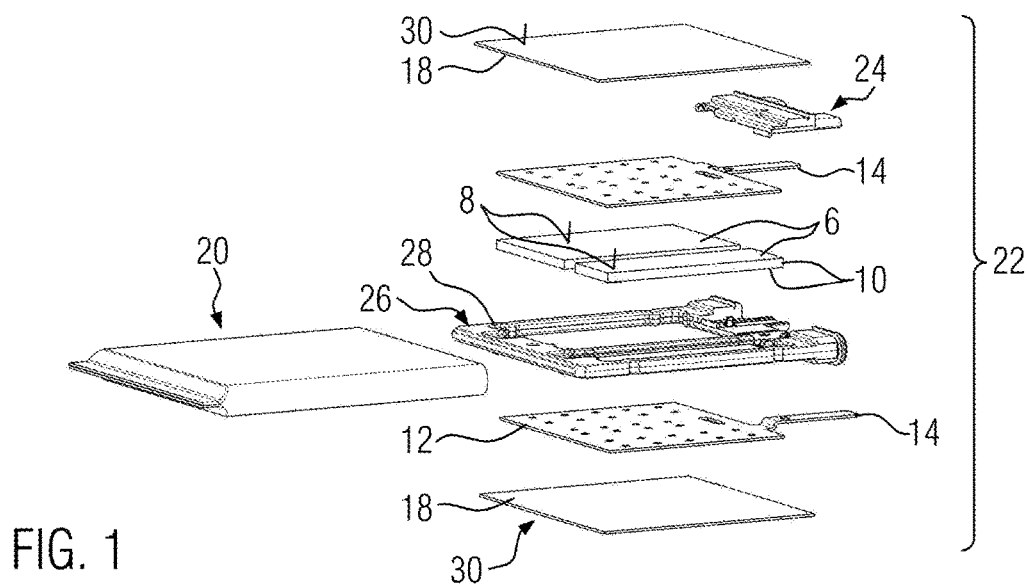
FIG. 1 shows a perspective exploded view of the embodiment of a PTC heating device.

The embodiment of a PTC heating device shown in FIG. 1 has a casing 2 made of plastic material which is configured to be frame-shaped and forms a receiving space 4 for receiving PTC elements 6. The two PTC elements 6 are each formed to be cuboid-shaped and have oppositely disposed surfaces 8 which form the main side surfaces of the PTC element 6 and which are each connected to one another by circumferential face surfaces 10. Shown disposed opposite to surface 8 are conductor tracks, each in the form of contact plates 12, and each of which has a contact strip 14 formed from the sheet material by punching and bending. Provided corresponding to these contact strips 14 are nozzles 16 on the casing 2 which accommodate the respective contact strips 14 so that the contact strips 14 with their free end project over the casing 2. These free ends of the contact strips 14 are used to energize the PTC elements 6 within the casing 2.

Reference numeral 18 shows insulating layers in the form of aluminum oxide plates, the base area of which is larger than the base area of the contact plates 12 (without the contact strip 14) and which in the joined state largely cover the frame-shaped casing 2.

FIG. 1 further shows a heating rib 20 in the shape of a flat tube made of metal which is closed on the underside and into which the embodiment of the PTC heating device, identified overall with reference number 22, is to be inserted.

FIG. 1 illustrates a casing cap 24 which is connected to the casing 2 after the PTC elements 6 have been installed in the receptacle and the contact plate 12 has been joined with the casing 2. The contact strip 14 have bores. The casing 2 has pins formed adapted thereto that pass through the bores after assembly. The casing cap 24 is clipped or otherwise connected to the casing 2, as a result of which the contact strips 14 and therefore the contact plates 12 are fixedly connected to the casing 2.

The casing 2 has a leading frame member which is identified by reference number 26 and has elastic guide tabs 28 projecting over itself, respectively on both sides, at two different locations in the width direction. These elastic guide tabs 28 are connected to the casing 2 by way of integral hinges. They are mounted to be pivotable. The guide tabs 28 are inclined obliquely backwards. This inclination can be seen in particular in FIGS. 3 to 5. The elastic guide tabs 28 are inclined in the direction of a heat-emitting open surface 30, i.e., backwards with respect to a direction of insertion. This open surface 30 is formed in the present case by the outer surface of the respective aluminum oxide plates 18.

Figure 3:
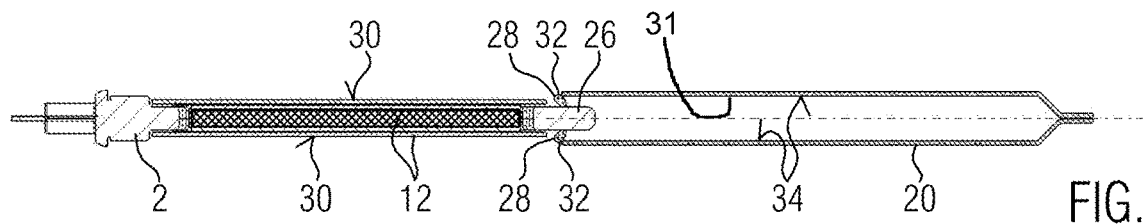
FIG. 3 shows the illustration according to FIG. 2 in a longitudinal sectional view.

The elastic guide tabs 28 allow the PTC heating device to be centered prior to being inserted into a receiving pocket 31 defined by the heating rib 20. This centering is illustrated in FIG. 3. The central longitudinal axis of the PTC heating device 22 can be seen to be aligned with the central longitudinal axis of the heating rib 20. The elastic guide tabs 28 in FIG. 3 abut against mutually oppositely disposed edges 32 of the heating rib 20.

Figure 4:
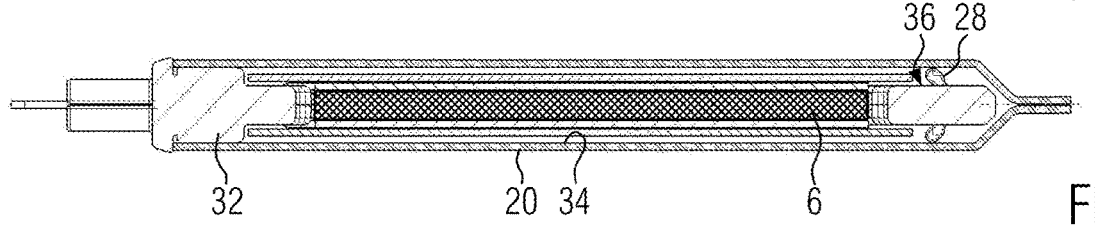
FIG. 4 shows a longitudinal sectional view according to FIG. 3 after joining.

The situation after joining is shown in FIG. 4. The elastic guide tabs 28 are provided near the base of the heating rib 20 which is closed on the underside. The edges 32 abut against a collar of the casing 2, whereby the end position of the PTC heating device 22 within the heating rib 20 is predetermined. There is still a gap in FIG. 4 between the heat-emitting open surfaces 30 and mutually oppositely disposed inner surfaces 34 of the heating rib 20.

Figure 5:
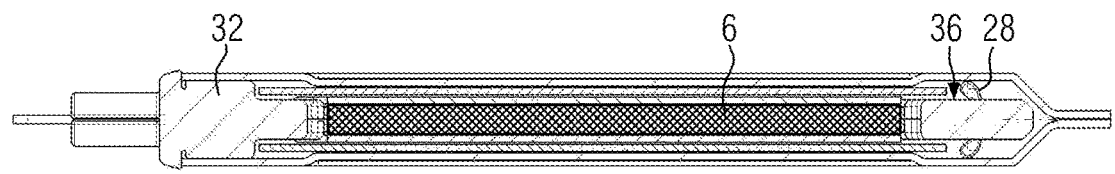
FIG. 5 shows a longitudinal sectional view according to FIG. 4 after the flat tube has been deformed and FIG. 6 shows a perspective side view of an embodiment of a PTC heating device.

It is closed by deformation. As can be seen in FIG. 5, the heating rib 20 is deformed in such a way that the inner surface 34 of the receiving pocket 31 directly contacts the open surface 30 so that good heat dissipation up to the outer side of the heating rib 20 is given.

Figure 2:
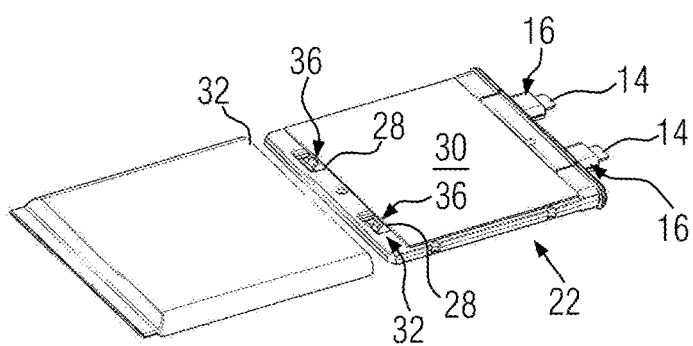
FIG. 2 shows a perspective side view of the embodiment of a PTC heating device shown in FIG. 1 prior to being joined with a flat tube.

FIG. 2 illustrates the arrangement of the guide tabs 28 selected in the embodiment. They are provided in pairs in a recess 36. A respective pair of guide tabs 28 is received in each of the recesses 36. A respective guide tab protrudes from each recess 36 to the one open surface 30 and another to the oppositely disposed open surface 30. The recesses 36 are sized such that the elastic guide tabs 28 can pivot into the recess 36 when the PTC heating device is introduced into the receiving pocket 31 and can be received in the recess 36.

Figure 6:
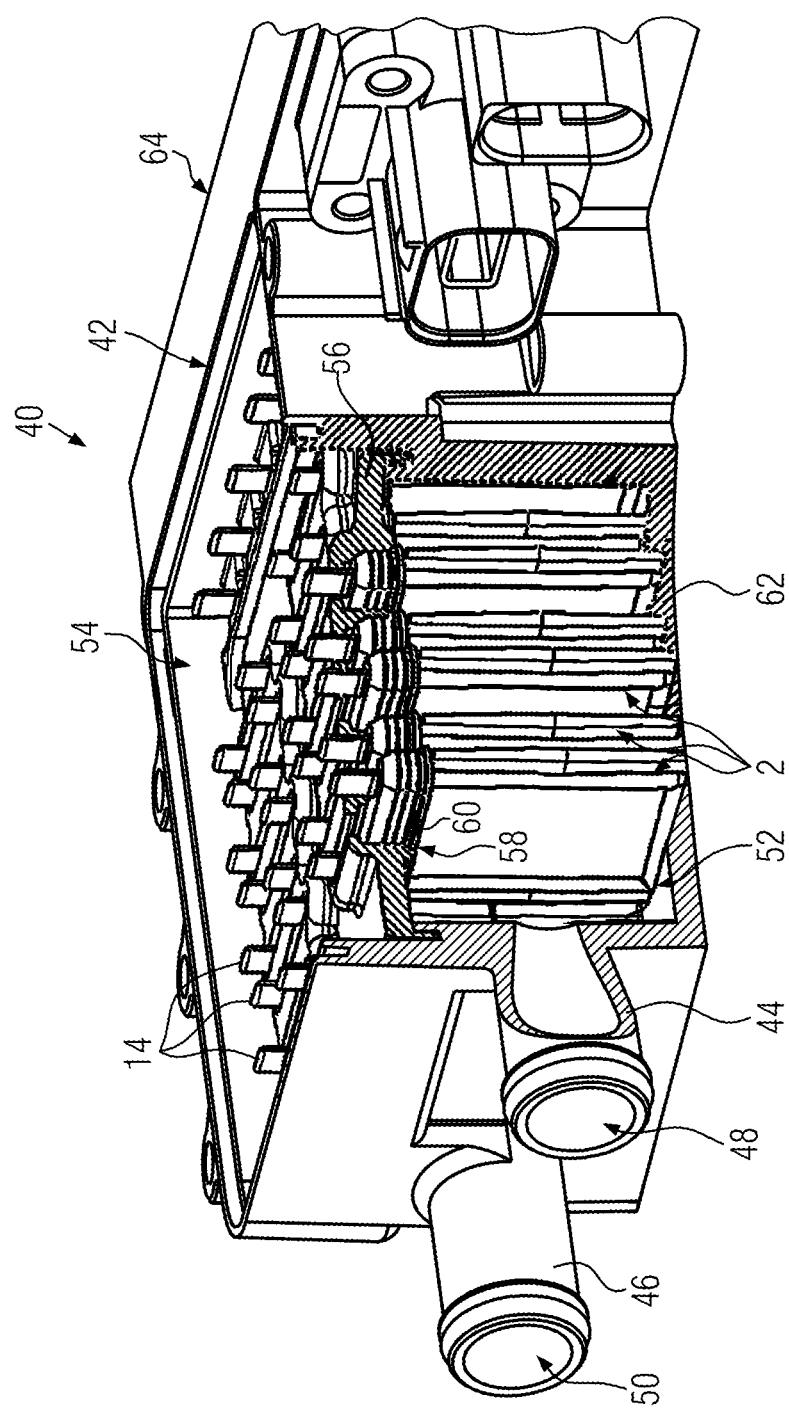

FIG. 6 shows a perspective top view onto a heater casing marked with reference numeral 40 of an electric heating device formed as a water heater. The heater casing 40 has a casing tub element 42 made of plastic material. The heater casing 40 forms an inlet port 44 and an outlet port 46 which are presently embodied formed integrally on the casing tub element 42. The ports 44, 46 are designed as hose connection ports and form an inlet opening 48 and an outlet opening 50, respectively, to a heating chamber designated with reference numeral 52.

The heating chamber 52 is separated from a connection chamber 54 and sealed thereagainst by a partition wall 56 made of plastic material. The partition wall 56 forms female plug element holding fixtures 58 for PTC heating elements 22 which are inserted into the female plug element holding fixtures 58, sealed therein by a sealing collar 60 connected to the housing 2 and supported on a base 62 of the casing tub element 4. Reference numeral 64 identifies a control housing, described in further detail in DE 10 2019 205 848.

What is claimed is:

1. A PTC heating device for the introduction into a receiving pocket of an electric heating device, the PTC heating device comprising:
   at least one PTC element,
   a conductor track that is electrically connected to the PTC element,
   insulating layers that are abutted in a thermally conductive manner against the PTC element
   a frame-shaped casing that joins the at least one PTC element, the conductor track, and the insulating layers as a unit and that has contact strips projecting over itself which are connected to the conductor tracks in an electrically conductive manner for energizing the PTC element with different polarities, wherein the frame-shaped casing forms mutually oppositely disposed recesses, in each of which is exposed a respective heat-emitting open surface connected in a thermally conductive manner to the main side surface of the PTC element;
   wherein the frame-shaped casing has a leading frame member with elastic guide tabs which, in an initial assembly state, project on oppositely disposed sides of the frame-shaped casing over the leading frame member respectively associated with them, which are inclined obliquely from the leading frame member in a direction of the open surface, and which are elastically pivotable.

2. The PTC heating device according to claim 1, wherein the frame-shaped casing is formed from plastic material and the guide tabs are formed integrally on the casing.

3. The PTC heating device according to claim 1, wherein the leading frame member forms a recess accommodating at least one of the inwardly pivoted guide tabs.

4. The PTC heating device according to claim 3, wherein the recess accommodates two guide tabs projecting towards oppositely disposed sides of the recess.

5. The PTC heating device according to claim 3, wherein two respective pairs of guide tabs, projecting towards oppositely disposed sides of the casing, are provided adjacent to each other in the width direction of the casing.

6. An electric heating device comprising:
   at least one PTC heating device arranged in a heating chamber,
   at least one PTC element, conductor tracks electrically connected to the at least one PTC element, insulating layers abutting in a heat-conductive manner against the PTC element a frame-shaped casing that joins the at least one PTC heating element, the conductor tracks, and the insulting layers as a unit and that has contact strips projecting over itself which are electrically conductively connected to the conductor tracks for energizing the PTC element with different polarities, which contact strips are electrically connected in a connection chamber which is separated from the heating chamber by a partition wall, wherein the PTC heating device is received in a receiving pocket of a heating rib projecting into the heating chamber, wherein the frame-shaped casing has a leading frame member with elastic guide tabs which, in an initial state of assembly, project on oppositely disposed sides of the frame-shaped casing over the leading frame member respectively associated with them, which are inclined obliquely from the leading frame member in a direction of the open surface, and which are elastically pivotable.

7. The electric heating device according to claim 6, wherein the frame-shaped casing is formed from plastic material, and the guide tabs are formed integrally on the casing.

8. The electric heating device according to claim 6, wherein the leading frame member forms a recess accommodating at least one of the inwardly pivoted guide tabs.

9. The electric heating device according to claim 8, wherein the recess accommodates two guide tabs projecting towards oppositely disposed sides of the recess.

10. The electric heating device according to claim 8, wherein two respective pairs of guide tabs, projecting towards oppositely disposed sides of the recess, are provided adjacent to each other in a width direction of the casing.

11. A method for producing an electric heating device in which a frame-shaped casing is formed with elastic guide tabs that are provided on a leading frame spar and that project on oppositely disposed sides from the frame-shaped casing, the frame-shaped casing being fitted with at least one PTC element, conductor tracks electrically connected to the PTC element and insulating layers that are abutted in a thermally conductive manner to the PTC element for producing a PTC heating device with oppositely disposed heat-emitting open surfaces, the method comprising inserting the PTC heating device with the leading frame member into a receiving pocket of a heating rib of the electric heating device such that the guide tabs are initially abutted against oppositely disposed edges of the receiving pocket and such that guide tabs are pivoted inwardly as the introduction motion progresses, wherein after completion of the inserting, the open surfaces are abutted against oppositely disposed inner walls of the receiving pocket by deforming the receiving pocket.

* * * * *